(12) United States Patent
Choi

(10) Patent No.: US 12,120,440 B2
(45) Date of Patent: Oct. 15, 2024

(54) IMAGE SENSOR

(71) Applicant: SK hynix Inc., Gyeonggi-do (KR)

(72) Inventor: Dong Gwi Choi, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 24 days.

(21) Appl. No.: 17/860,592

(22) Filed: Jul. 8, 2022

(65) Prior Publication Data

US 2023/0217125 A1 Jul. 6, 2023

(30) Foreign Application Priority Data

Dec. 31, 2021 (KR) .................. 10-2021-0194369

(51) Int. Cl.
*H04N 25/60* (2023.01)
*H04N 25/75* (2023.01)
*H04N 25/772* (2023.01)

(52) U.S. Cl.
CPC ............. *H04N 25/60* (2023.01); *H04N 25/75* (2023.01); *H04N 25/772* (2023.01)

(58) Field of Classification Search
CPC ....... H04N 25/60; H04N 25/772; H04N 25/75
See application file for complete search history.

(56) References Cited

U.S. PATENT DOCUMENTS

| 8,773,191 B2 | 7/2014 | Park et al. |
| 9,154,714 B2 * | 10/2015 | Nakamura ........... H04N 25/772 |
| 2016/0277691 A1 * | 9/2016 | Jo ......................... H04N 25/67 |

* cited by examiner

*Primary Examiner* — Twyler L Haskins
*Assistant Examiner* — Fayez A Bhuiyan
(74) *Attorney, Agent, or Firm* — IP & T GROUP LLP

(57) ABSTRACT

Disclosed is an image sensor including a first comparison circuit suitable for comparing an active pixel signal with a ramp signal to generate a first comparison signal through a first comparison output terminal, and a first compensation circuit coupled to the first comparison output terminal, and suitable for selectively applying a first compensation noise, which corresponds to a power noise generated by the first comparison circuit, to the first comparison output terminal on the basis of a first control signal.

18 Claims, 11 Drawing Sheets

IMAGE SENSOR

CROSS-REFERENCE TO RELATED APPLICATION(S)

This application claims priority under 35 U.S.C. § 119 to Korean Patent Application No. 10-2021-0194369, filed on Dec. 31, 2021, the disclosure of which is incorporated herein by reference in its entirety.

BACKGROUND

1. Field

Various embodiments of the present disclosure relate to a semiconductor design technique, and more particularly, to an image sensor including a signal converter.

2. Description of the Related Art

Image sensing devices are devices for capturing images using the property of a semiconductor which reacts to light. Image sensing devices may be roughly classified into charge-coupled device (CCD) image sensing devices and complementary metal-oxide semiconductor (CMOS) image sensing devices. Recently, CMOS image sensing devices are widely used because the CMOS image sensing devices can allow both analog and digital control circuits to be directly implemented on a single integrated circuit (IC).

SUMMARY

Various embodiments of the present disclosure are directed to an image sensor for compensating for power noise occurring in a signal converter.

In accordance with an embodiment of the present disclosure, an image sensor may include: a first comparison circuit suitable for comparing an active pixel signal with a ramp signal to generate a first comparison signal through a first comparison output terminal; and a first compensation circuit coupled to the first comparison output terminal, and suitable for selectively applying a first compensation noise, which corresponds to a power noise generated by the first comparison circuit, to the first comparison output terminal on the basis of a first control signal.

The image sensor may further include: a second comparison circuit coupled to the first comparison output terminal, and suitable for comparing the first comparison signal with a reference signal to generate a second comparison signal through a second comparison output terminal; and a second compensation circuit coupled to an input terminal of the reference signal, and suitable for selectively applying a second compensation noise, which corresponds to the power noise, to the input terminal on the basis of at least one second control signal.

In accordance with an embodiment of the present disclosure, an image sensor may include: a first comparison circuit suitable for comparing an active pixel signal with a ramp signal to generate a first comparison signal through a first comparison output terminal; a second comparison circuit coupled to the first comparison output terminal, and suitable for comparing the first comparison signal with a reference signal to generate a second comparison signal through a second comparison output terminal; and a compensation circuit coupled to an input terminal of the reference signal, and suitable for selectively applying a compensation noise, which corresponds to a power noise generated by the first comparison circuit, to the input terminal on the basis of at least one control signal.

In accordance with an embodiment of the present disclosure, an image sensor may include: a pixel array including a dark region allocated to at least one column and an active region allocated to at least one column; a signal converter suitable for converting a dark pixel signal, which is generated from the dark region, into a dark pixel code, converting an active pixel signal, which is generated from the active region, into an active pixel code, and compensating for the active pixel code on the basis of one or more control signals; and a controller suitable for generating the control signals on the basis of the dark pixel code and a reference pixel code.

In accordance with an embodiment of the present disclosure, an image sensor may include: first and second pixel groups respectively configured to output first and second pixel signals; first and second readout circuits respectively configured to convert the first and second pixel signals into first and second pixel codes; and a controller configured to compare the first pixel code with a reference code to generate a control signal, wherein the second readout circuit includes: a first circuit configured to compare the second pixel signal with a ramp signal to output a first signal at an output node; a second circuit configured to compare the first signal with a reference signal, which is input at an input node, to output a second signal, from which the second pixel code is to be generated; and a third circuit configured to provide, in response to the control signal, one or more of the input and output nodes with a noise compensating for a power noise caused by the first circuit.

DETAILED DESCRIPTION

Various embodiments of the present disclosure are described below with reference to the accompanying drawings, in order to describe in detail the present disclosure so that those with ordinary skill in art to which the present disclosure pertains may easily carry out the technical spirit of the present disclosure.

It will be understood that when an element is referred to as being "connected to" or "coupled to" another element, the element may be directly connected to or coupled to the another element, or electrically connected to or coupled to the another element with one or more elements interposed therebetween. In addition, it will also be understood that the terms "comprises," "comprising," "includes," and "including" when used in this specification do not preclude the presence of one or more other elements, but may further include or have the one or more other elements, unless otherwise mentioned. In the description throughout the specification, some components are described in singular forms, but the present disclosure is not limited thereto, and it will be understood that the components may be formed in plural.

Figure 1:
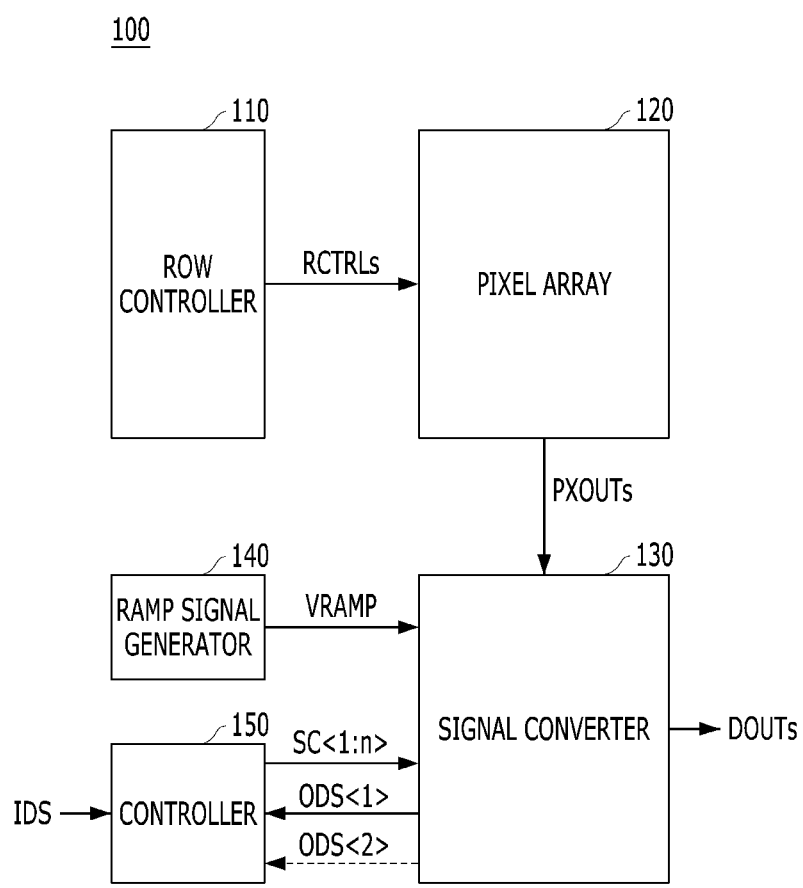
FIG. 1 is a block diagram illustrating an image sensor in accordance with an embodiment of the present disclosure.

FIG. 1 is a block diagram illustrating an image sensor 100 in accordance with an embodiment of the present disclosure.

Referring to FIG. 1, the image sensor 100 may include a row controller 110, a pixel array 120, a signal converter 130, a ramp signal generator 140 and a controller 150.

The row controller 110 may generate a plurality of row control signals RCTRLs for controlling the pixel array 120 for each row. For example, the row controller 110 may generate first row control signals for controlling pixels arranged in a first row of the pixel array 120, and generate $y^{th}$ row control signals for controlling pixels arranged in an $y^{th}$ row of the pixel array 120, where "y" is a natural number greater than 2. The row control signals RCTRLs may include the first to $y^{th}$ row control signals.

Figure 2:
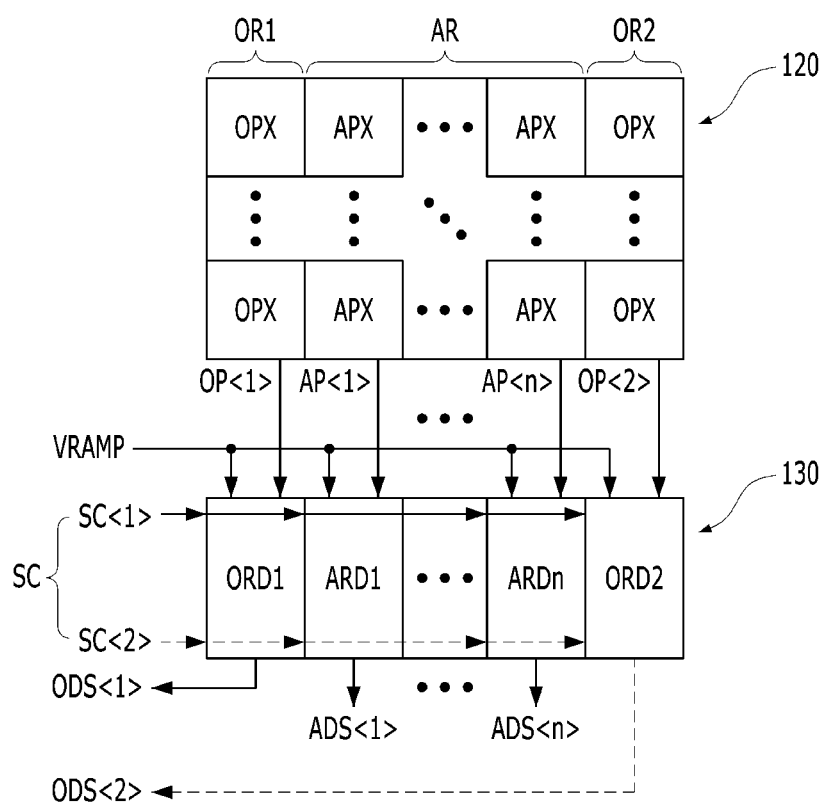
FIG. 2 is a block diagram illustrating a pixel array and a signal converter illustrated in FIG. 1 in accordance with an embodiment of the present disclosure.

The pixel array 120 may include a plurality of pixels arranged at intersections of a plurality of rows and a plurality of columns (refer to FIG. 2). The plurality of pixels may output a plurality of pixel signals PXOUTs through a plurality of column lines for each row on the basis of the row control signals RCTRLs. For example, the pixels arranged in the first row among the plurality of pixels may generate the plurality of pixel signals PXOUTs for a first unit row time on the basis of the first row control signals, and the pixels arranged in the $y^{th}$ row among the plurality of pixels may generate the plurality of pixel signals PXOUTs for an $y^{th}$ unit row time on the basis of the $y^{th}$ row control signals. The pixel array 120 may include first and second dark regions OR1 and OR2 and an active region AR, which are to be described below (refer to FIG. 2). Hereinafter, each pixel signal generated from the first and second dark regions OR1 and OR2 among the plurality of pixel signals PXOUTs is referred to as a "dark pixel signal OP<#>", and each pixel signal generated from the active region AR among the plurality of pixel signals PXOUTs is referred to as an "active pixel signal AP<#>".

The signal converter 130 may generate a plurality of pixel codes DOUTs on the basis of a ramp signal VRAMP and the plurality of pixel signals PXOUTs. Hereinafter, each pixel code related to the first and second dark regions OR1 and OR2 among the plurality of pixel codes DOUTs is referred to as a "dark pixel code ODS<#>", and each pixel code related to the active region AR among the plurality of pixel codes DOUTs is referred to as an "active pixel code ADS<#>". For example, the signal converter 130 may convert each dark pixel signal OP<#> into each dark pixel code ODS<#>, and convert each active pixel signal AP<#> to each active pixel code ADS<#>. The signal converter 130 may compensate for each active pixel code ADS<#> on the basis of at least one control signal SC.

The ramp signal generator 140 may generate the ramp signal VRAMP. The ramp signal VRAMP may ramp in a predetermined pattern, and be repeatedly generated for each unit row time.

The controller 150 may generate the control signal SC on the basis of a first dark pixel code ODS<1> and a reference pixel code IDS. For example, the controller 150 may activate the control signal SC when the first dark pixel code ODS<1> is greater than the reference pixel code IDS. The first dark pixel code ODS<1> may be an actual dark pixel code generated from the pixel array 130, and the reference pixel code IDS may be a predetermined ideal dark pixel code. The reference pixel code IDS may be stored in the image sensor 100 or be provided from an external device (not illustrated). According to an embodiment, it is described as an example that the controller 150 uses the first dark pixel code ODS<1>, but the present disclosure is not limited thereto, and the controller 150 may use first and second dark pixel codes ODS<1:2>. When using the first and second dark pixel codes ODS<1:2>, the controller 150 may generate a more accurate and precise control signal SC than when using only the first dark pixel code ODS<1>.

FIG. 2 is a block diagram illustrating the pixel array 120 and the signal converter 130 illustrated in FIG. 1 in accordance with an embodiment of the present disclosure.

Referring to FIG. 2, the pixel array 120 may include the first and second dark regions OR1 and OR2 and the active region AR. For example, the first dark region OR1 may be disposed on one side of the pixel array 120 in a horizontal direction, the second dark region OR2 may be disposed on the other side of the pixel array 120 in the horizontal direction, and the active region AR may be disposed between the first and second dark regions OR1 and OR2. The first dark region OR1 may include pixels OPX disposed in at least one column among the plurality of pixels included in the pixel array 120. For example, each of the pixels OPX may be an optical black pixel. The first dark region OR1 may generate a first dark pixel signal OP<1> for each row. The second dark region OR2 may include pixels OPX disposed in at least one column among the plurality of pixels included in the pixel array 120. The second dark region OR2 may generate a second dark pixel signal OP<2> for each row. The active region AR may include pixels APX disposed in a plurality of columns among the plurality of pixels included in the pixel array 120. The active region AR may generate first to $n^{th}$ active pixel signals AP<1:n> for each row, where "n" is a natural number greater than 2.

The signal converter 130 may include first and second dark readout circuits ORD1 and ORD2 respectively corresponding to the first and second dark regions OR1 and OR2, and first to $n^{th}$ active readout circuits ARD1 to ARDn corresponding to the active region AR. The first dark readout circuit ORD1 may generate the first dark pixel code ODS<1> on the basis of the first dark pixel signal OP<1>, the ramp signal VRAMP and the control signal SC. The second dark readout circuit ORD2 may generate the second dark pixel code ODS<2> on the basis of the second dark pixel signal OP<2>, the ramp signal VRAMP and the control signal SC. The first to $n^{th}$ active readout circuits ARD1 to ARDn may generate first to $n^{th}$ active pixel codes ADS<1:n> on the basis of the first to $n^{th}$ active pixel signals AP<1:n>, the ramp signal VRAMP and the control signal SC. The control signal SC may include only a first control signal SC<1> or first and second control signals SC<1:2>, depending on an embodiment of the signal converter 130. Since the first and second dark readout circuits ORD1 and ORD2 and the first to $n^{th}$ active readout circuits ARD1 to ARDn included in the signal converter 130 may be designed in the same manner, hereinafter, the first active readout circuit ARD1 is described representatively.

Figure 3:
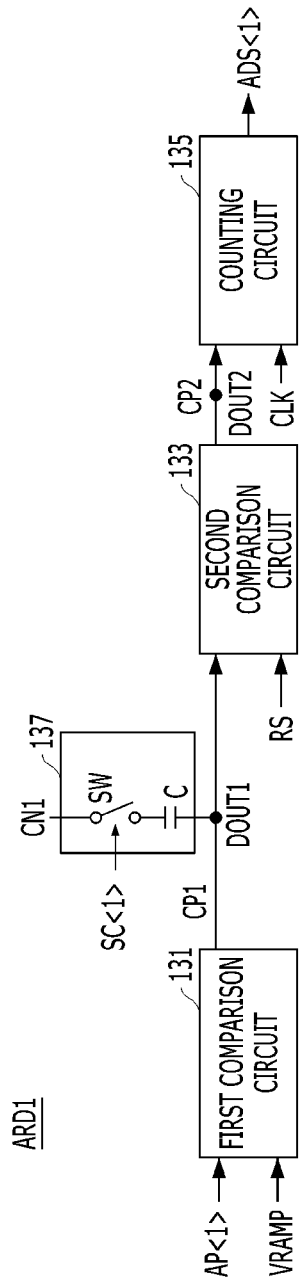
FIG. 3 is a block diagram illustrating an example of a first readout circuit illustrated in FIG. 2 in accordance with an embodiment of the present disclosure.
Figure 4:
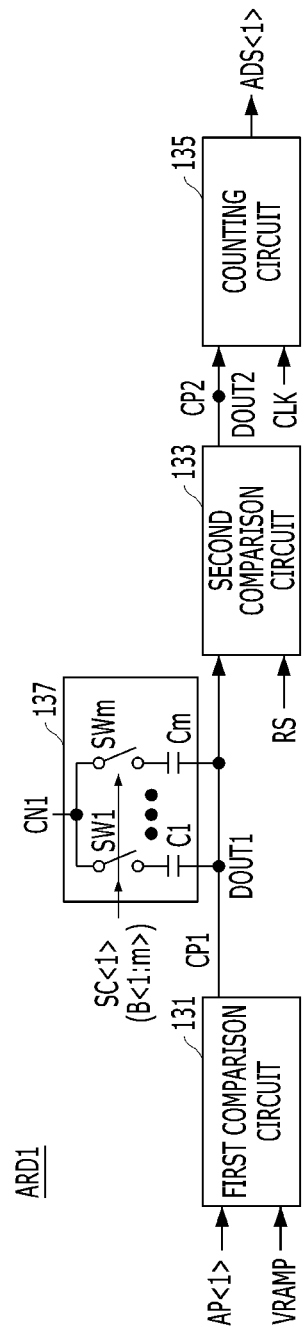
FIG. 4 is a block diagram illustrating another example of the first readout circuit illustrated in FIG. 3 in accordance with an embodiment of the present disclosure.

FIG. 3 is a block diagram illustrating an example of the first active readout circuit ARD1 illustrated in FIG. 2 in accordance with an embodiment of the present disclosure. FIG. 4 is a block diagram illustrating another example of the first active readout circuit ARD1 illustrated in FIG. 2 in accordance with an embodiment of the present disclosure. In FIGS. 3 and 4, the control signal SC may include only the first control signal SC<1>.

Referring to FIG. 3, the first active readout circuit ARD1 may include a first comparison circuit 131, a second comparison circuit 133, a counting circuit 135 and a compensation circuit 137.

The first comparison circuit 131 may compare the first active pixel signal AP<1> with the ramp signal VRAMP, and generate a first comparison signal CP1, which corresponds to the comparison result, through a first comparison output terminal DOUT1.

The second comparison circuit 133 may be coupled to the first comparison output terminal DOUT1. The second comparison circuit 133 may compare the first comparison signal CP1 with a reference signal RS, and generate a second comparison signal CP2, which corresponds to the comparison result, through a second comparison output terminal DOUT2.

The counting circuit 135 may be coupled to the second comparison output terminal DOUT2. The counting circuit 135 may generate the first active pixel code ADS<1> on the basis of the second comparison signal CP2 and a clock signal CLK.

The compensation circuit 137 may be coupled to the first comparison output terminal DOUT1. The compensation circuit 137 may selectively apply compensation noise CN1, which corresponds to power noise generated by at least the first comparison circuit 131, to the first comparison output terminal DOUT1 on the basis of the first control signal SC<1>. For example, the compensation circuit 137 may include a capacitor C and a switch SW. The capacitor C may be coupled between the first comparison output terminal DOUT1 and the switch SW. The capacitor C may be a physically-composed actual capacitor, for example, a metal insulator metal (MIM) capacitor, or a parasitic capacitor. The switch SW may be coupled between the capacitor C and a supply terminal of the compensation noise CN1. The switch SW may selectively provide the capacitor C with the compensation noise CN1 on the basis of the first control signal SC<1>. The compensation circuit 137 may apply the compensation noise CN1 to the first comparison output terminal DOUT1, thereby adjusting transition time of the first comparison signal CP1, which is generated through the first comparison output terminal DOUT1, so that the transition time corresponds to the power noise. For example, the compensation circuit 137 may advance or delay the transition time of the first comparison signal CP1 according to a code difference between the first dark pixel code ODS<1> and the reference pixel code IDS.

Moreover, the compensation circuit 137 may be designed as illustrated in FIG. 4. The compensation circuit 137 may include a plurality of capacitors C1 to Cm and a plurality of switches SW1 to SWm, where "m" is a natural number equal to or greater than 2. The plurality of capacitors C1 to Cm may be coupled between the first comparison output terminal DOUT1 and the respective switches SW1 to SWm. Each of the plurality of capacitors C1 to Cm may be a physically-composed actual capacitor, for example, a metal insulator metal (MIM) capacitor, or a parasitic capacitor. The plurality of switches SW1 to SWm may be coupled between the respective capacitors C1 to Cm and the supply terminal of the compensation noise CN1. The plurality of switches SW1 to SWm may selectively provide the respective capacitors C1 to Cm with the compensation noise CN1 on the basis of the first control signal SC<1>. The first control signal SC<1> may include a plurality of bits B<1:m> corresponding to the plurality of switches SW1 to SWm. The plurality of switches SW1 to SWm may be individually controlled by the plurality of bits B<1:m>, thereby finely adjusting the compensation noise CN1 applied to the first comparison output terminal DOUT1.

Figure 5:
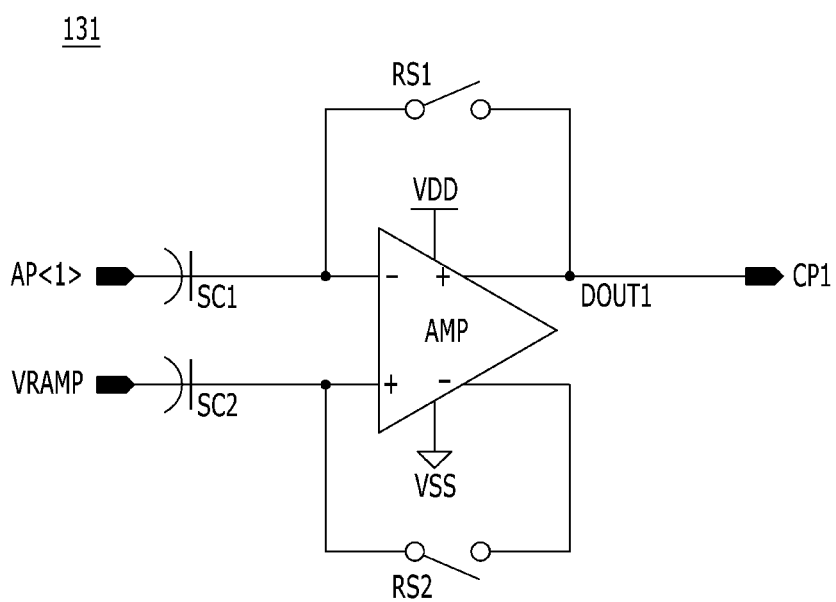
FIG. 5 is a circuit diagram illustrating a first comparison circuit illustrated in FIGS. 3 and 4 in accordance with an embodiment of the present disclosure.

FIG. 5 is a circuit diagram illustrating the first comparison circuit 131 illustrated in FIGS. 3 and 4 in accordance with an embodiment of the present disclosure.

Referring to FIG. 5, the first comparison circuit 131 may include a first capacitor SC1, a second capacitor SC2, an amplifier AMP, a first switch RS1 and a second switch RS2.

The first capacitor SC1 may be coupled between an input terminal of the first active pixel signal AP<1> and an inverting input terminal (−) of the amplifier AMP.

The second capacitor SC2 may be coupled between an input terminal of the ramp signal VRAMP and a non-inverting input terminal (+) of the amplifier AMP.

The amplifier AMP may be coupled between the inverting input terminal (−), the non-inverting input terminal (+) and a non-inverting output terminal (+). The non-inverting output terminal (+) may be the first comparison output terminal DOUT1. The amplifier AMP may use a high voltage VDD and a low voltage VSS. The power noise may occur from a supply terminal of the high voltage VDD or a supply terminal of the low voltage VSS when the amplifier AMP operates. The power noise may occur due to influence of coupling between the supply terminal of the high voltage VDD and the first comparison output terminal DOUT1 (or an output line of the first comparison signal CP1), or influence of coupling between the supply terminal of the low voltage VSS and the first comparison output terminal DOUT1 (or the output line), depending on design. The power noise may cause banding noise (refer to FIG. 11).

The first switch RS1 may be coupled between the non-inverting input terminal (+) and an inverting output terminal (−).

The second switch RS2 may be coupled between the inverting input terminal (−) and the non-inverting output terminal (+).

In an embodiment, since each of the second comparison circuits 133 illustrated in FIGS. 3 and 4 may be designed similarly to the first comparison circuit 131 illustrated in FIG. 5, a detailed description thereof is omitted.

Figure 6:
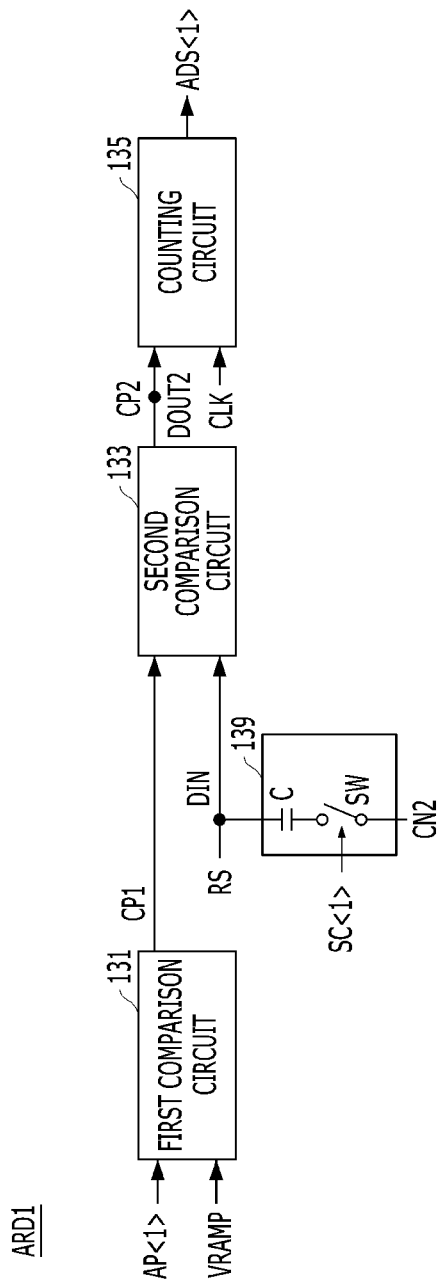
FIG. 6 is a block diagram illustrating still another example of the first readout circuit illustrated in FIG. 2 in accordance with an embodiment of the present disclosure.
Figure 7:
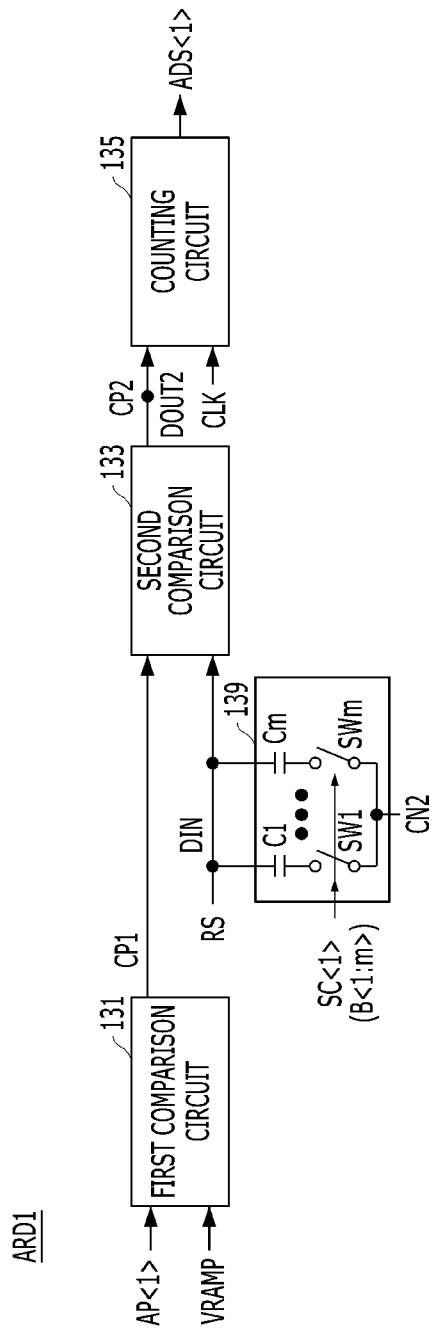
FIG. 7 is a block diagram illustrating yet another example of the first readout circuit illustrated in FIG. 2 in accordance with an embodiment of the present disclosure.

FIG. 6 is a block diagram illustrating still another example of the first active readout circuit ARD1 illustrated in FIG. 2 in accordance with an embodiment of the present disclosure. FIG. 7 is a block diagram illustrating yet another example of the first active readout circuit ARD1 illustrated in FIG. 2 in accordance with an embodiment of the present disclosure. In FIGS. 6 and 7, the control signal SC may include only the first control signal SC<1>.

Referring to FIG. 6, the first active readout circuit ARD1 may include a first comparison circuit 131, a second comparison circuit 133, a counting circuit 135 and a compensation circuit 139.

The first comparison circuit 131 may compare the first active pixel signal AP<1> with the ramp signal VRAMP, and generate a first comparison signal CP1, which corresponds to the comparison result, through a first comparison output terminal DOUT1.

The second comparison circuit 133 may be coupled to the first comparison output terminal DOUT1. The second comparison circuit 133 may compare the first comparison signal CP1 with a reference signal RS, and generate a second comparison signal CP2, which corresponds to the comparison result, through a second comparison output terminal DOUT2.

The counting circuit 135 may be coupled to the second comparison output terminal DOUT2. The counting circuit 135 may generate the first active pixel code ADS<1> on the basis of the second comparison signal CP2 and a clock signal CLK.

The compensation circuit 139 may be coupled to an input terminal DIN of the reference signal RS. The compensation circuit 139 may selectively apply compensation noise CN2, which corresponds to at least power noise generated by at least the first comparison circuit 131, to the input terminal DIN on the basis of the first control signal SC<1>. The compensation noise CN2 may have opposite directionality to the compensation noise CN1 illustrated in FIG. 3. For example, the compensation circuit 139 may include a capacitor C and a switch SW. The capacitor C may be coupled between the input terminal DIN and the switch SW. The capacitor C may be a physically-composed actual capacitor, for example, a metal insulator metal (MIM) capacitor, or a parasitic capacitor. The switch SW may be coupled between the capacitor C and a supply terminal of the compensation noise CN2. The switch SW may selectively provide the capacitor C with the compensation noise CN2 on the basis of the first control signal SC<1>. The compensation circuit 139 may apply the compensation noise CN2 to the input terminal DIN of the reference signal RS, thereby adjusting transition time of the first comparison signal CP1, which is generated through the first comparison output terminal DOUT1, so that the transition time corresponds to the power noise. For example, the compensation circuit 139 may advance or delay the transition time of the first comparison signal CP1 according to a code difference between the first dark pixel code ODS<1> and the reference pixel code IDS.

The compensation circuit 139 may be designed as illustrated in FIG. 7. The compensation circuit 139 may include a plurality of capacitors C1 to Cm and a plurality of switches SW1 to SWm, where "m" is a natural number equal to or greater than 2. The plurality of capacitors C1 to Cm may be coupled between the input terminal DIN and the respective switches SW1 to SWm. Each of the plurality of capacitors C1 to Cm may be a physically-composed actual capacitor, for example, a metal insulator metal (MIM) capacitor, or a parasitic capacitor. The plurality of switches SW1 to SWm may be coupled between the respective capacitors C1 to Cm and the supply terminal of the compensation noise CN2. The plurality of switches SW1 to SWm may selectively provide the respective capacitors C1 to Cm with the compensation noise CN2 on the basis of the first control signal SC<1>. The first control signal SC<1> may include a plurality of bits B<1:m> corresponding to the plurality of switches SW1 to SWm. The plurality of switches SW1 to SWm may be individually controlled by the plurality of bits B<1:m>, thereby finely adjusting the compensation noise CN2 applied to the input terminal DIN.

Figure 8:
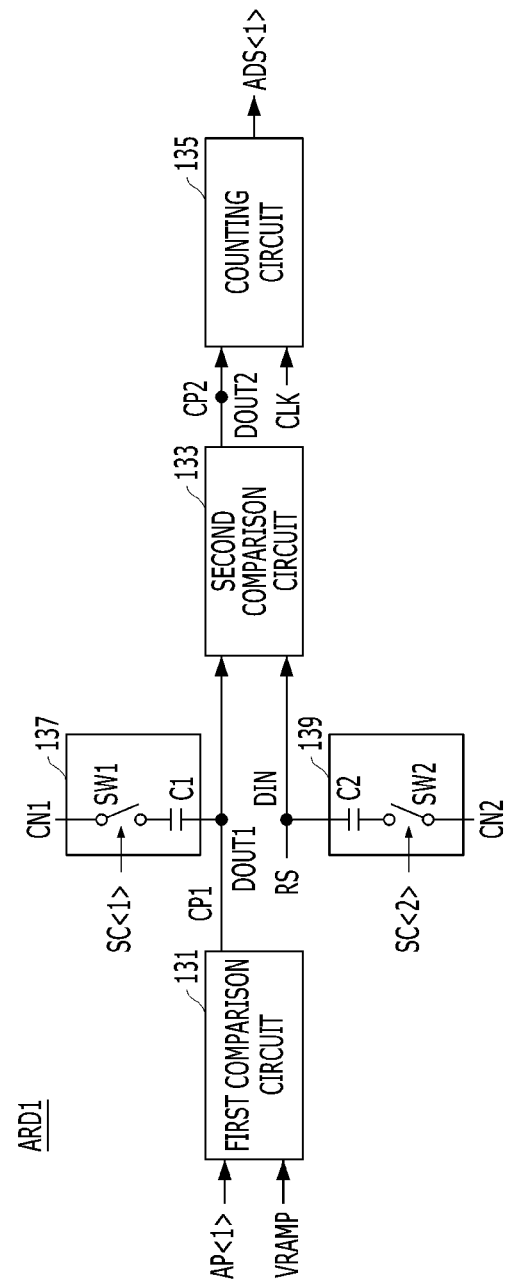
FIG. 8 is a block diagram illustrating still yet another example of the first readout circuit illustrated in FIG. 2 in accordance with an embodiment of the present disclosure.
Figure 9:
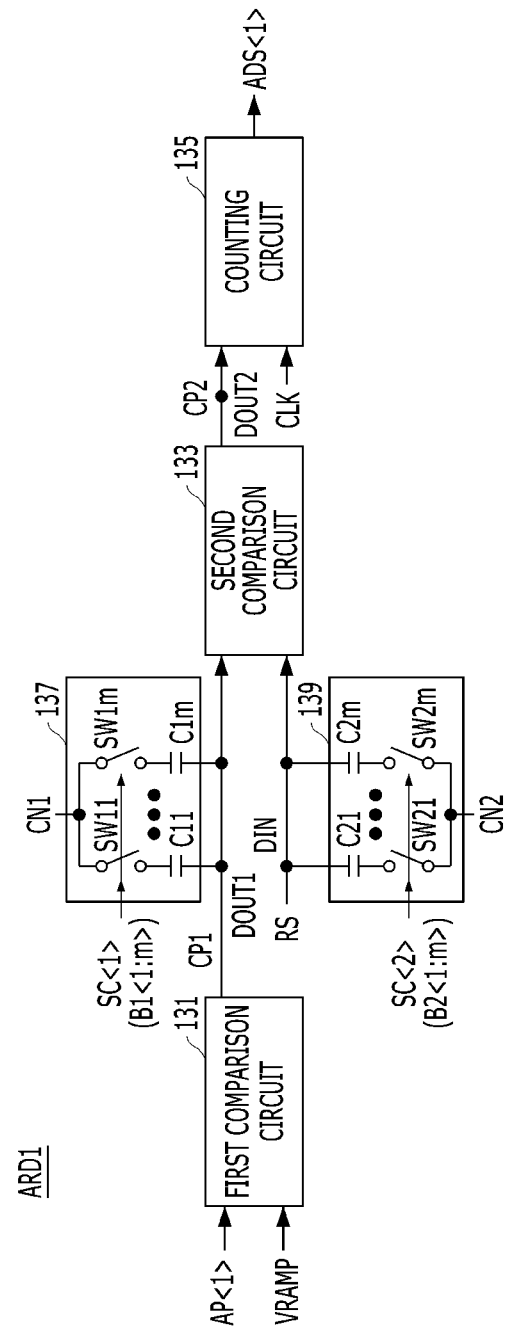
FIG. 9 is a block diagram illustrating a further example of the first readout circuit illustrated in FIG. 2 in accordance with an embodiment of the present disclosure.

FIG. 8 is a block diagram illustrating still yet another example of the first active readout circuit ARD1 illustrated in FIG. 2 in accordance with an embodiment of the present disclosure. FIG. 9 is a block diagram illustrating a further example of the first active readout circuit ARD1 illustrated in FIG. 2 in accordance with an embodiment of the present disclosure. In FIGS. 8 and 9, the control signal SC may include the first and second control signals SC<1:2>.

Referring to FIG. 8, the first active readout circuit ARD1 may include a first comparison circuit 131, a second comparison circuit 133, a counting circuit 135, a first compensation circuit 137 and a second compensation circuit 139.

The first comparison circuit 131 may compare the first active pixel signal AP<1> with the ramp signal VRAMP, and generate a first comparison signal CP1, which corresponds to the comparison result, through a first comparison output terminal DOUT1.

The second comparison circuit 133 may be coupled to the first comparison output terminal DOUT1. The second comparison circuit 133 may compare the first comparison signal CP1 with a reference signal RS, and generate a second comparison signal CP2, which corresponds to the comparison result, through a second comparison output terminal DOUT2.

The counting circuit 135 may be coupled to the second comparison output terminal DOUT2. The counting circuit 135 may generate the first active pixel code ADS<1> on the basis of the second comparison signal CP2 and a clock signal CLK.

The first compensation circuit 137 may be coupled to the first comparison output terminal DOUT1. The first compensation circuit 137 may selectively apply first compensation noise CN1, which corresponds to power noise generated by at least the first comparison circuit 131, to the first comparison output terminal DOUT1 on the basis of the first control signal SC<1>. For example, the first compensation circuit 137 may include a first capacitor C1 and a first switch SW1. The first capacitor C1 may be coupled between the first comparison output terminal DOUT1 and the first switch SW1. The first capacitor C1 may be a physically-composed actual capacitor, for example, a metal insulator metal (MIM) capacitor, or a parasitic capacitor. The first switch SW1 may be coupled between the first capacitor C1 and a supply terminal of the first compensation noise CN1. The first switch SW1 may selectively provide the first capacitor C1 with the first compensation noise CN1 on the basis of the first control signal SC<1>.

The second compensation circuit 139 may be coupled to an input terminal DIN of the reference signal RS. The second compensation circuit 139 may selectively apply second compensation noise CN2, which corresponds to power noise generated by at least the first comparison circuit 131, to the input terminal DIN on the basis of the second control signal SC<2>. The second compensation noise CN2 may have opposite directionality to the first compensation noise CN1. For example, the second compensation circuit 139 may include a second capacitor C2 and a second switch SW2. The second capacitor C2 may be coupled between the input terminal DIN and the second switch SW2. The second capacitor C2 may be a physically-composed actual capacitor, for example, a metal insulator metal (MIM) capacitor, or a parasitic capacitor. The second switch SW2 may be coupled between the second capacitor C2 and a supply terminal of the second compensation noise CN2. The second switch SW2 may selectively provide the second capacitor C2 with the second compensation noise CN2 on the basis of the second control signal SC<2>.

Moreover, the first and second compensation circuits 137 and 139 may be designed as illustrated in FIG. 9. The first compensation circuit 137 may include a plurality of first capacitors C11 to C1$m$ and a plurality of first switches SW11 to SW1$m$, where "m" is a natural number equal to or greater than 2. The plurality of first capacitors C11 to C1$m$ may be coupled between the first comparison output terminal DOUT1 and the respective first switches SW11 to SW1$m$. Each of the plurality of first capacitors C11 to C1$m$ may be a physically-composed actual capacitor, for example, a metal insulator metal (MIM) capacitor, or a parasitic capacitor. The plurality of first switches SW11 to SW1$m$ may be coupled between the respective first capacitors C11 to C1$m$ and the supply terminal of the first compensation noise CN1. The plurality of first switches SW11 to SW1$m$ may selectively provide the respective first capacitors C11 to C1$m$ with the first compensation noise CN1 on the basis of the first control signal SC<1>. The first control signal SC<1> may include a plurality of first bits B1<1:m> corresponding to the plurality of first switches SW11 to SW1$m$. The plurality of first switches SW11 to SW1$m$ may be individually controlled by the plurality of first bits B1<1:m>, thereby finely adjusting the first compensation noise CN1 applied to the first comparison output terminal DOUT1. The second compensation circuit 139 may include a plurality of second capacitors C21 to C2$m$ and a plurality of second switches SW21 to SW2$m$, where "m" is a natural number equal to or greater than 2. The plurality of second capacitors C21 to C2$m$ may be coupled between an input terminal DIN of the reference signal RS and the respective second switches SW21 to SW2$m$. Each of the plurality of second capacitors C21 to C2$m$ may be a physically-composed actual capacitor, for example, a metal insulator metal (MIM) capacitor, or a parasitic capacitor. The plurality of second switches SW21 to SW2$m$ may be coupled between the respective second capacitors C21 to C2$m$ and the supply terminal of the second compensation noise CN2. The plurality of second switches SW21 to SW2$m$ may selectively provide the respective second capacitors C21 to C2$m$ with the second compensation noise CN2 on the basis of the second control signal SC<2>. The second control signal SC<2> may include a plurality of second bits B2<1:m> corresponding to the plurality of second switches SW21 to SW2$m$. The plurality of second switches SW21 to SW2$m$ may be individually controlled by the plurality of second bits B2<1:m>, thereby finely adjusting the second compensation noise CN2 applied to the input terminal DIN.

Figure 10:
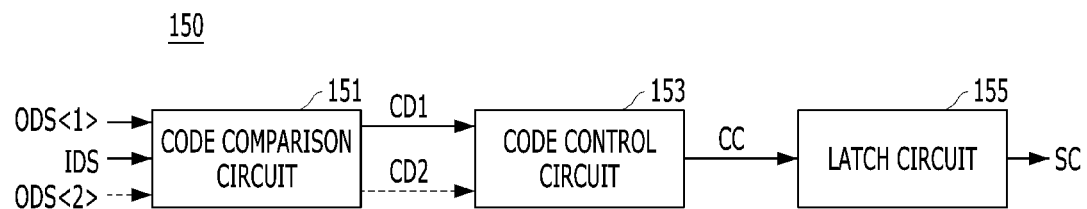
FIG. 10 is a block diagram illustrating a controller illustrated in FIG. 1 in accordance with an embodiment of the present disclosure.

FIG. 10 is a block diagram illustrating the controller 150 illustrated in FIG. 1 in accordance with an embodiment of the present disclosure.

Referring to FIG. 10, the controller 150 may include a code comparison circuit 151, a code control circuit 153 and a latch circuit 155.

According to an example, the code comparison circuit 151 may compare the first dark pixel code ODS<1> with the reference pixel code IDS, and generate a first code comparison signal CD1 corresponding to the comparison result. According to an example, the code comparison circuit 151 may compare the first dark pixel code ODS<1> with the reference pixel code IDS and generate the first code comparison signal CD1 corresponding to the comparison result, and compare the second dark pixel code ODS<2> with the reference pixel code IDS and generate a second code comparison signal CD2 corresponding to the comparison result.

According to an example, the code control circuit 153 may generate a code control signal CC on the basis of the first code comparison signal CD1. For example, the code control circuit 153 may activate the code control signal CC when the first dark pixel code ODS<1> is greater than the reference pixel code IDS. When the code control signal CC has a plurality of bits corresponding to the plurality of bits B<1:m>, the plurality of bits may be selectively activated according to a code difference between the first dark pixel code ODS<1> and the reference pixel code IDS. According to an example, the code control circuit 153 may generate the code control signal CC on the basis of the first and second code comparison signals CD1 and CD2. For example, the code control circuit 153 may activate the code control signal CC according to a combination of the comparison result of the first dark pixel code ODS<1> and the reference pixel code IDS and the comparison result of the second dark pixel code ODS<2> and the reference pixel code IDS. When the code control signal CC has a plurality of bits corresponding to the plurality of bits B<1:m>, the plurality of bits B<1:m> may be selectively activated according to a combination of a code difference between the first dark pixel code ODS<1> and the reference pixel code IDS and a code difference between the second dark pixel code ODS<2> and the reference pixel code IDS.

The latch circuit 155 may latch the code control signal CC. The latch circuit 155 may output the code control signal CC as the control signal SC to the compensation circuit(s) 137 and/or 139.

Hereinafter, an operation of the image sensor 100 in accordance with an embodiment, which has the above-described configuration, is described with reference to FIGS. 11 and 12.

Figure 11:
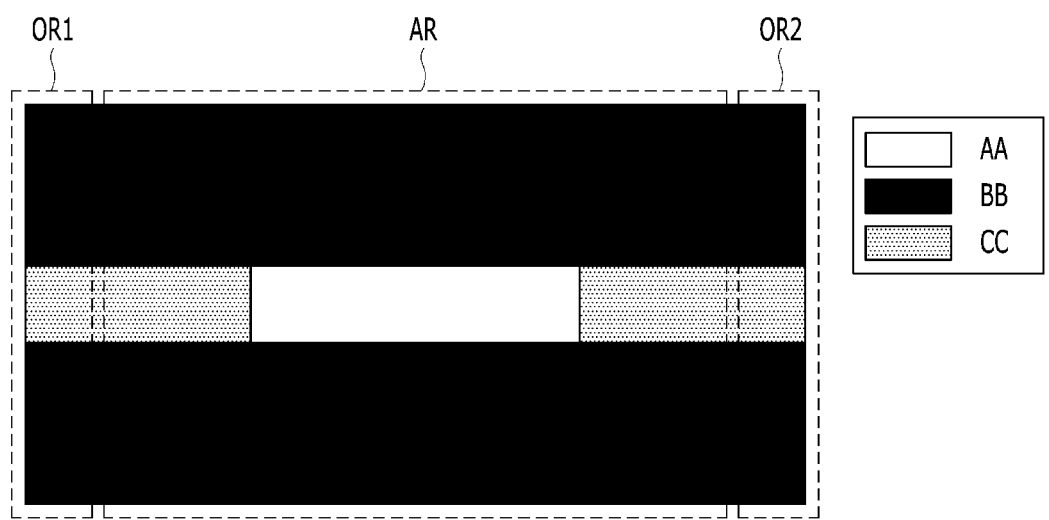
FIG. 11 is a diagram illustrating an output image according to a prior art.

FIG. 11 is a diagram illustrating an output image of an image sensor according to a prior art.

Referring to FIG. 11, the output image may substantially correspond to the active region AR of the pixel array 120. When light enters only a central region of the active region AR, the central region of the active region AR may be a bright region AA that receives the light, and a peripheral region of the central region of the active region AR may be a dark region BB that does not receive the light. A region of the dark region BB, which is adjacent to a horizontal direction of the bright region AA, that is, a row direction of the pixel array 120, may include a defective region CC attributable to the banding noise. Since power noise occurring when the signal converter 130 converts the first to $n^{th}$ active pixel signals AP<1:n> generated from a row of the pixel array 120 including only the dark region BB into the first to $n^{th}$ active pixel codes ADS<1:n> is different from power noise occurring when the signal converter 130 converts the first to $n^{th}$ active pixel signals AP<1:n> generated from a row of the pixel array 120 including the bright region AA and the dark region BB into the first to $n^{th}$ active pixel codes ADS<1:n>, the defective region CC may occur.

Figure 12:
FIG. 12 is a diagram illustrating an output image in accordance with an embodiment of the present disclosure.

FIG. 12 is a diagram illustrating an output image of the image sensor 100 in accordance with an embodiment of the present disclosure.

Referring to FIG. 12, the image sensor 100 may detect power noise generated by the signal converter 130, particularly, the power noise related to the bright region AA, and apply compensation noise CN1 and/or CN2 corresponding to the power noise to the signal converter 130, thereby removing the defective region CC illustrated in FIG. 11.

According to an example, when the first active readout circuit ARD1 included in the signal converter 130 is designed as illustrated in FIG. 3, the compensation circuit 137 may apply the compensation noise CN1 to the first comparison output terminal DOUT1. When the power noise occurs at the supply terminal of the low voltage VSS, the compensation circuit 137 may apply the compensation noise CN1, which has a voltage level corresponding to the high voltage VDD having an opposite phase to the low voltage VSS, to the first comparison output terminal DOUT1, thereby reducing the influence of coupling between the supply terminal of the low voltage VSS and the first comparison output terminal DOUT1. When the power noise occurs at the supply terminal of the high voltage VDD, the compensation circuit 137 may apply the compensation noise CN1, which has a voltage level corresponding to the low voltage VSS having an opposite phase to the high voltage VDD, to the first comparison output terminal DOUT1, thereby reducing the influence of coupling between the supply terminal of the high voltage VDD and the first comparison output terminal DOUT1.

According to an example, when the first active readout circuit ARD1 included in the signal converter 130 is designed as illustrated in FIG. 6, the compensation circuit 139 may apply the compensation noise CN2 to the input terminal DIN. When the power noise occurs at the supply terminal of the low voltage VSS, the compensation circuit 139 may apply the compensation noise CN2, which has a voltage level corresponding to the low voltage VSS having the same phase as the low voltage VSS, to the input terminal DIN, thereby reducing the influence of coupling between the supply terminal of the low voltage VSS and the first comparison output terminal DOUT1. When the power noise occurs at the supply terminal of the high voltage VDD, the compensation circuit 139 may apply the compensation noise CN2, which has a voltage level corresponding to the high voltage VDD having the same phase as the high voltage VDD, to the input terminal DIN, thereby reducing the influence of coupling between the supply terminal of the high voltage VDD and the first comparison output terminal DOUT1.

According to an embodiment of the present disclosure, the influence of coupling between an output terminal of a comparison circuit and a voltage terminal may be controlled, which makes it possible to remove a defective region caused by the banding noise.

According to an embodiment of the present disclosure, power noise occurring in a signal converter may be removed or suppressed, thereby improving the quality of an image.

While the present disclosure has been illustrated and described with respect to specific embodiments, the disclosed embodiments are provided for the description, and not intended to be restrictive. Further, it is noted that the present disclosure may be achieved in various ways through substitution, change, and modification that fall within the scope of the following claims, as those skilled in the art will recognize in light of the present disclosure. Furthermore, the embodiments may be combined to form additional embodiments.

What is claimed is:

1. An image sensor comprising:
a first comparison circuit suitable for comparing an active pixel signal with a ramp signal to generate a first comparison signal through a first comparison output terminal;
an output circuit suitable for receiving the first comparison signal and generating an output signal corresponding to the first comparison signal; and
a first compensation circuit coupled between the first comparison output terminal and a supply terminal of a first compensation noise, and suitable for selectively applying the first compensation noise, which corresponds to a power noise generated by the first comparison circuit, to the first comparison output terminal on the basis of a first control signal.

2. The image sensor of claim 1, wherein the first compensation circuit includes:
at least one first capacitor coupled to the first comparison output terminal; and
at least one first switch coupled between the first capacitor and the supply terminal of the first compensation noise, and suitable for selectively providing the first capacitor with the first compensation noise on the basis of the first control signal.

3. The image sensor of claim 1, further comprising:
a pixel array including a dark region allocated to at least one column and an active region allocated to a plurality of columns;
a readout circuit suitable for converting a dark pixel signal, which is generated from the dark region, into a dark pixel code; and
a controller suitable for generating the first control signal on the basis of the dark pixel code and a reference pixel code.

4. The image sensor of claim 3, wherein the controller includes:
a code comparison circuit suitable for comparing the dark pixel code with the reference pixel code to generate a code comparison signal;
a code control circuit suitable for generating a code control signal on the basis of the code comparison signal; and
a latch circuit suitable for latching the code control signal, and outputting the first control signal to the compensation circuit.

5. The image sensor of claim 1, further comprising:
a second comparison circuit coupled to the first comparison output terminal, and suitable for comparing the first comparison signal with a reference signal to generate a second comparison signal through a second comparison output terminal; and
a second compensation circuit coupled between an input terminal of the reference signal and a supply terminal of a second compensation noise, and suitable for selectively applying the second compensation noise, which corresponds to the power noise, to the input terminal on the basis of at least one second control signal.

6. The image sensor of claim 5, wherein the second compensation circuit includes:
at least one second capacitor coupled to the input terminal; and
at least one second switch coupled between the second capacitor and the supply terminal of the second compensation noise, and suitable for selectively providing the second capacitor with the second compensation noise on the basis of the second control signal.

7. The image sensor of claim 5, further comprising:
a pixel array including a dark region allocated to at least one column and an active region allocated to at least one column;

a readout circuit suitable for converting a dark pixel signal, which is generated from the dark region, into a dark pixel code; and a controller suitable for generating the first control signal and the second control signal on the basis of the dark pixel code and a reference pixel code.

8. The image sensor of claim 7, wherein the controller includes:
a code comparison circuit suitable for comparing the dark pixel code with the reference pixel code to generate a code comparison signal;
a code control circuit suitable for generating a first code control signal and a second code control signal on the basis of the code comparison signal; and
a latch circuit suitable for latching the first and second code control signals, and outputting the first control signal to the first compensation circuit and the second control signal to the second compensation circuit.

9. An image sensor comprising:
a first comparison circuit suitable for comparing an active pixel signal with a ramp signal to generate a first comparison signal through a first comparison output terminal;
a second comparison circuit coupled to the first comparison output terminal, and suitable for comparing the first comparison signal with a reference signal to generate a second comparison signal through a second comparison output terminal; and
a compensation circuit coupled between an input terminal of the reference signal and a supply terminal of a compensation noise, and suitable for selectively applying the compensation noise, which corresponds to a power noise generated by the first comparison circuit, to the input terminal on the basis of at least one control signal.

10. The image sensor of claim 9, wherein the compensation circuit includes:
at least one capacitor coupled to the input terminal; and
at least one switch coupled between the supply terminal of the compensation noise the capacitor, and suitable for selectively providing the capacitor with the compensation noise on the basis of the control signal.

11. The image sensor of claim 9, further comprising:
a pixel array including a dark region allocated to at least one column and an active region allocated to at least one column;
at least one readout circuit suitable for converting a dark pixel signal, which is generated from the dark region, into a dark pixel code; and
a controller suitable for generating the control signal on the basis of the dark pixel code and a reference pixel code.

12. The image sensor of claim 11, wherein the controller includes:
a code comparison circuit suitable for comparing the dark pixel code with the reference pixel code to generate a code comparison signal;
a code control circuit suitable for generating a code control signal on the basis of the code comparison signal; and
a latch circuit suitable for latching the code control signal, and outputting the control signal to the compensation circuit.

13. An image sensor comprising:
a pixel array including a dark region allocated to at least one column and an active region allocated to at least one column;

a signal converter including a comparison circuit and a compensation circuit coupled between a supply terminal of the compensation noise and an output terminal or an input terminal of the comparison circuit, and suitable for converting a dark pixel signal, which is generated from the dark region, into a dark pixel code, converting an active pixel signal, which is generated from the active region, into an active pixel code, and compensating for the active pixel code by applying the compensation noise to the output terminal or the input terminal of the comparison circuit on the basis of a control signal; and
a controller suitable for generating the control signal on the basis of the dark pixel code and a reference pixel code.

14. The image sensor of claim 13, wherein the controller includes:
a code comparison circuit suitable for comparing the dark pixel code with the reference pixel code to generate a code comparison signal;
a code control circuit suitable for generating a code control signal on the basis of the code comparison signal; and
a latch circuit suitable for latching the code control signal, and outputting the control signal to the signal converter.

15. The image sensor of claim 13, wherein the signal converter includes:
the comparison circuit suitable for comparing the active pixel signal with a ramp signal to generate a comparison signal through the output terminal; and
the compensation circuit coupled to the output terminal, and suitable for selectively applying the compensation noise, which corresponds to a power noise generated by the comparison circuit, to the output terminal on the basis of the control signal.

16. The image sensor of claim 13, wherein the compensation circuit includes:
at least one capacitor coupled to the output terminal; and
at least one switch coupled between the capacitor and the supply terminal, and suitable for selectively providing the capacitor with the compensation noise on the basis of the control signal.

17. The image sensor of claim 13, wherein the signal converter includes:
a first comparison circuit suitable for comparing the active pixel signal with a ramp signal to generate a first comparison signal through a first output terminal;
the comparison circuit coupled to the first output terminal, and suitable for comparing the first comparison signal with a reference signal to generate a comparison signal through an output terminal; and
the compensation circuit coupled to the input terminal of the reference signal, and suitable for selectively applying the compensation noise, which corresponds to a power noise generated by the first comparison circuit, to the input terminal on the basis of the control signal.

18. The image sensor of claim 17, wherein the compensation circuit includes:
at least one capacitor coupled to the input terminal; and
at least one switch coupled between the capacitor and the supply terminal, and suitable for selectively providing the capacitor with the compensation noise on the basis of the control signal.

* * * * *